US012785560B2

(12) United States Patent
Li et al.

(10) Patent No.: US 12,785,560 B2
(45) Date of Patent: Nov. 3, 2026

(54) BUCK CONVERTER WITH ADAPTIVE TURN-ON FREQUENCY OF PULL-UP TRANSISTOR

(71) Applicant: MEDIATEK INC., Hsinchu City (TW)

(72) Inventors: Chih-Chen Li, Hsinchu City (TW); Jin-Yan Syu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 151 days.

(21) Appl. No.: 18/799,344

(22) Filed: Aug. 9, 2024

(65) Prior Publication Data

US 2025/0079987 A1 Mar. 6, 2025

Related U.S. Application Data

(60) Provisional application No. 63/535,819, filed on Aug. 31, 2023.

(51) Int. Cl.
*H02M 3/158* (2006.01)
*H02M 1/00* (2006.01)
*H02M 1/14* (2006.01)

(52) U.S. Cl.
CPC ......... *H02M 3/158* (2013.01); *H02M 1/0032* (2021.05); *H02M 1/14* (2013.01)

(58) Field of Classification Search
CPC .. H02M 3/158; H02M 1/0032; H02M 3/1566; H02M 1/0003; H02M 1/14; H02M 1/143
See application file for complete search history.

(56) References Cited

U.S. PATENT DOCUMENTS 7,208,921 B2 4/2007 Walters
7,745,970 B2 6/2010 Radecker
9,099,919 B2 8/2015 Jing
9,143,032 B2 9/2015 Le
9,866,108 B2 1/2018 Mayell
9,887,624 B2 2/2018 Hofmann
10,199,917 B2 2/2019 Lee
10,615,692 B2 4/2020 Khayat
11,223,276 B1 * 1/2022 Cai ..................... H02M 1/0022
2008/0024100 A1 * 1/2008 Huang .................. H02M 3/158 323/282
2013/0027012 A1 * 1/2013 Huang .................... H02M 1/44 323/283
2025/0079970 A1 * 3/2025 Luo ..................... H02M 1/0025

FOREIGN PATENT DOCUMENTS

EP 2165407 B1 7/2020

* cited by examiner

*Primary Examiner* — Alex Torres-Rivera
(74) *Attorney, Agent, or Firm* — McClure, Qualey & Rodack, LLP

(57) ABSTRACT

A buck converter with an adaptive turn-on frequency of a pull-up transistor is shown. The buck converter uses a pulse-width modulation (PWM) control signal generator to generate a PWM control signal that drives a power transistor driver to generate PWM signals driving the pull-up transistor and pull-down transistor of the buck converter. Especially, the PWM control signal generator generates the PWM control signal based on feedback of an output voltage of the buck converter as well as feedback of a sensed current about a power transformation component of the buck converter, to modify a turn-on frequency of the pull-up transistor in response to a change in the sensed current.

13 Claims, 7 Drawing Sheets

BUCK CONVERTER WITH ADAPTIVE TURN-ON FREQUENCY OF PULL-UP TRANSISTOR

CROSS REFERENCE TO RELATED APPLICATIONS

This application claims the benefit of U.S. Provisional Application No. 63/535,819, filed Aug. 31, 2023, the entirety of which is incorporated by reference herein.

BACKGROUND OF THE INVENTION

Field of the Invention

The present invention relates to buck converters, and, in particular, to small-sized buck converters.

Description of the Related Art

The size of portable electronic products (such as smartphones, tablets, smart watches, etc.) has become smaller and smaller as science and technology have developed. The operating voltage of the on-chip components is getting lower and lower. Buck converters are required to convert an input voltage to an output voltage that is at the lower voltage level, to power the on-chip components. In a buck converter, a power transformation component plays a major role to lower the input voltage. For example, the power transformation component may be an inductor. In response to a heavy load situation, the inductance of a small-sized inductor drops significantly, which causes excessive ripples and considerably affects the conversion performance.

In traditional technology, a large-sized inductor is adopted to avoid excessive inductance changes. However, such a large inductor is not suitable for use in portable devices.

In another traditional technology, the use of buck converters operating at a constant high frequency is proposed to reduce the root mean square (RMS) current in the heavy load situation, which may result in considerable switching loss.

In another traditional technology, a hybrid buck using a switched capacitor connected in parallel with an inductor is proposed to achieve highly efficient operations. However, the use of a switched capacitor increases cost of product marketization.

How to realize a small-sized buck converter with high stability and low energy consumption is an important issue in this technical field.

BRIEF SUMMARY OF THE INVENTION

A new buck converter is proposed, which collects a sensed current about its power transformation component to adjust the turn-on frequency of a pull-up transistor coupled between the input voltage and the power transformation component. In this manner, high-frequency instability is solved.

In accordance with an exemplary embodiment of the disclosure, a buck converter includes a power transformation component, a pull-up transistor, a pull-down transistor, a power transistor driver, and a PWM control signal generator. The pull-up transistor is operative to couple the input voltage to the power transformation component. The pull-down transistor is operative to couple a ground terminal to the power transformation component. The power transformation component provides the output voltage. The power transistor driver receives a pulse-width modulation (PWM) control signal to generate PWM signals to control the gate terminals of the pull-up transistor and the pull-down transistor. The PWM control signal generator generates the PWM control signal based on feedback of the output voltage as well as feedback of a sensed current related to operations of the power transformation component, to modify a turn-on frequency of the pull-up transistor in response to a change in the sensed current.

In an exemplary embodiment, the PWM control signal generator sets the PWM control signal to its on status according to the sensed current, and resets the PWM control signal to its off status according to a status signal about the output voltage. In response to the PWM control signal being the on status, the pull-up transistor couples the input voltage to the power transformation component. In response to the PWM control signal being the off status, the pull-up transistor disconnects the input voltage from the power transformation component.

In another exemplary embodiment, the PWM control signal generator sets the PWM control signal to its on status according to a status signal about the output voltage, and resets the PWM control signal to its off status according to the sensed current.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention. The scope of the invention is determined by reference to the appended claims. In addition to the structure defined in the claims, the direct connection between the illustrated electronic components is also an implementation method of this case. In the description about the circuit details, the term "coupled to" represent direct or indirect connections.

Figure 1:
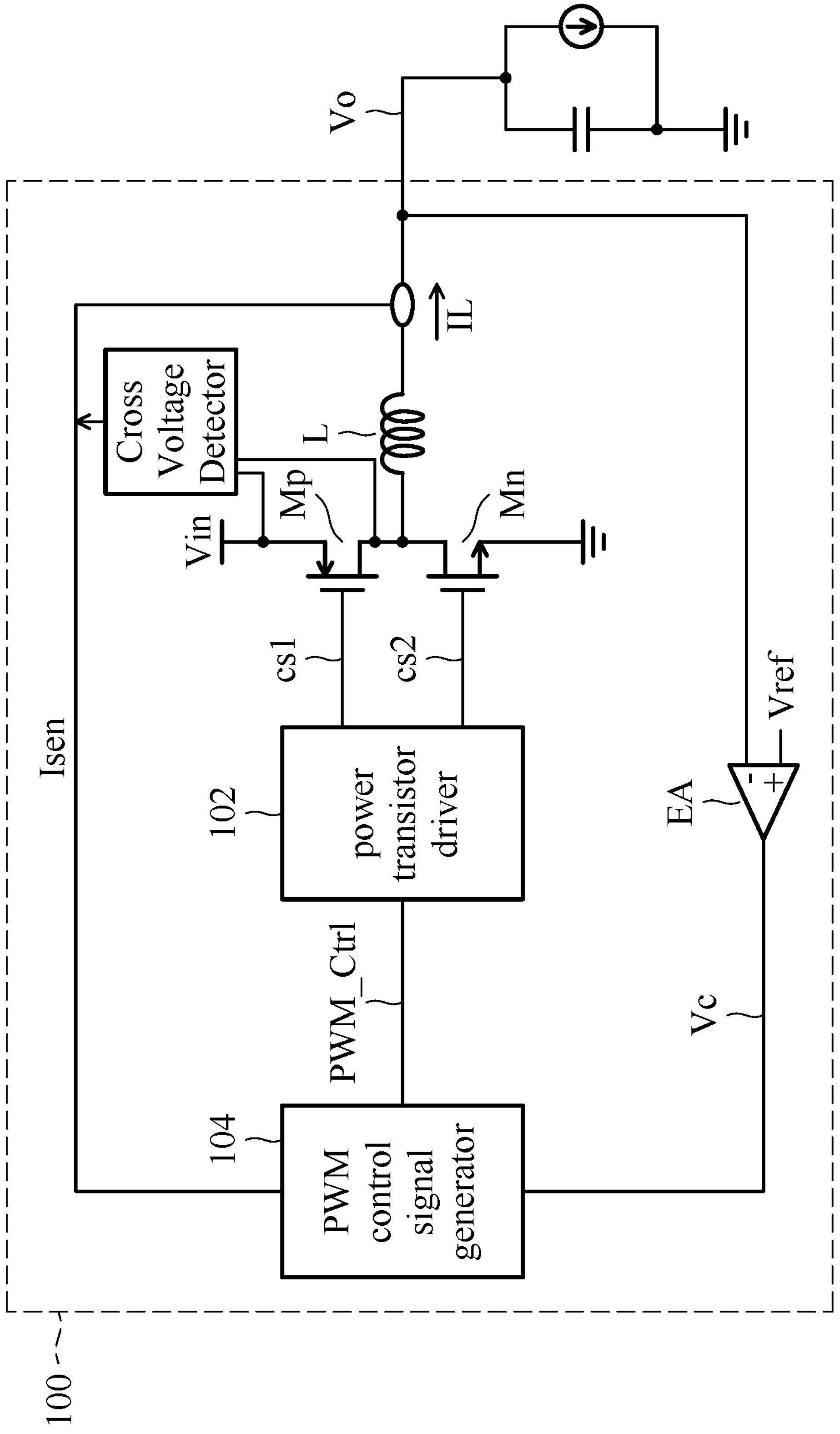
FIG. 1 illustrates a buck converter 100 in accordance with an exemplary embodiment of the disclosure.

FIG. 1 illustrates a buck converter 100 in accordance with an exemplary embodiment of the disclosure, which converts an input voltage Vin into an output voltage Vo.

The buck converter 100 uses an inductor L as a power transformation component, and includes a pull-up transistor Mp operative to couple the input voltage Vin to the inductor L, and a pull-down transistor Mn operative to couple the ground terminal to the inductor L. The buck converter 100 uses a power transistor driver 102 to drive the pull-up transistor Mp and the pull-down transistor Mn. The power transistor driver 102 may be a pulse-width modulation (PWM) signal generator, which generates PWM signals cs1 and cs2 according to a PWM control signal PWM_Ctrl. In response to the PWM signals cs1 and cs2 coupled to the gate terminals of the pull-up transistor Mp and the pull-down transistor Mn, the pull-up transistor Mp and the pull-down transistor Mn are controlled (turned on/off), respectively. The power transformation of the inductor L is modulated, and the output voltage Vo is regulated.

In the disclosure, the buck converter 100 uses a PWM control signal generator 104 to generate the PWM control signal PWM_Ctrl according to the feedback of the output voltage Vo as well as the feedback of the inductor current IL. As shown, the buck converter 100 uses an error amplifier that receives the output voltage Vo and a reference voltage Vref to amplify the difference therebetween, and feeds a status signal Vc about the output voltage Vo to the PWM control signal generator 104. In this example, the error amplifier EA has a positive input terminal '+' coupled to the reference voltage Vref, a negative input terminal '−' coupled to the output voltage Vo, and an output terminal outputting the status signal Vc about the output voltage Vo. As for the feedback of the inductor current IL of the inductor L, the buck converter 100 may sense a cross voltage of the pull-up transistor Mp to obtain a sensed current Isen related to the inductor current IL. With the information of the sensed current Isen, the PWM control signal generator 104 modulates the turn-on frequency of the pull-up transistor Mp rather than turning on the pull-up transistor Mp in a fixed frequency. In this manner, the inductance drop of the inductor L in the heavy load situation is alleviated. The inductor L, therefore, is allowed to be implemented in a small size (e.g., complying with the 3 nm or 4 nm mobile phone process). The buck converter 100 can be an advanced process design with high stability and low energy consumption.

The PWM control signal generator 104 operative to modify a turn-on frequency of the pull-up transistor Mp in response to a change in the sensed current Isen has multiple implementations. In some exemplary embodiments, the PWM control signal generator 104 sets the PWM control signal PWM_Ctrl to its on status according to the sensed current Isen, and resets the PWM control signal PWM_Ctrl to its off status according to the status signal Vc about the output voltage Vo. In response to the PWM control signal PWM_Ctrl being the on status, the pull-up transistor Mp couples the input voltage Vin to the inductor L. In response to the PWM control signal PWM_Ctrl being the off status, the pull-up transistor Mp disconnects the input voltage Vin from the inductor L. The turn-on frequency of the pull-up transistor Mp is controlled.

Figure 2:
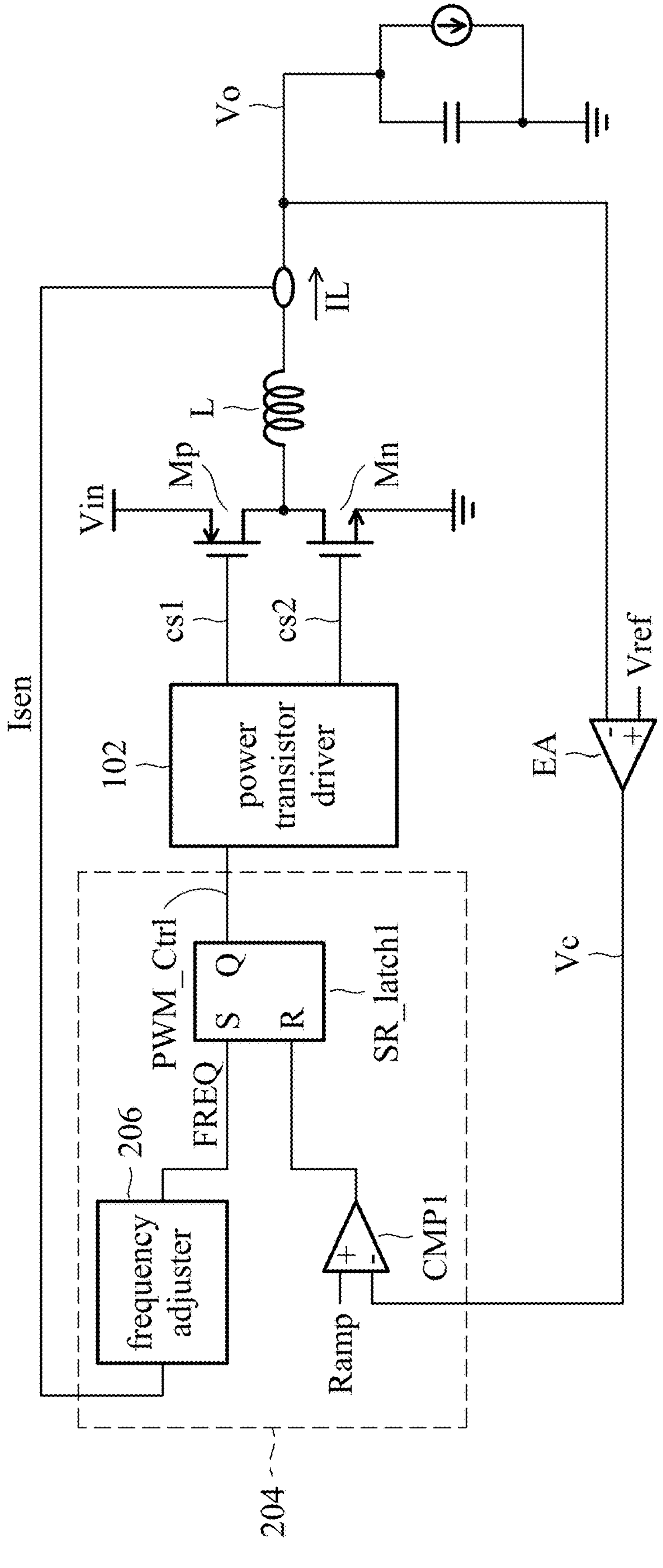
FIG. 2 illustrates a PWM control signal generator 204 having a first SR latch SR_latch1, a first comparator CMP1, and a frequency adjuster 206 in accordance with an exemplary embodiment of the disclosure.

FIG. 2 illustrates a PWM control signal generator 204 having a first SR latch SR_latch1, a first comparator CMP1, and a frequency adjuster 206 in accordance with an exemplary embodiment of the disclosure.

The first SR latch SR_latch1 has a 'Q' terminal for providing the PWM control signal PWM_Ctrl. An 'S' terminal of the first SR latch SR_latch1 operative to set the PWM control signal PWM_Ctrl to its on status is controlled by the frequency adjuster 206 that operates based on the sensed current Isen. An 'R' terminal of the first SR latch SR_latch1 operative to reset the PWM control signal PWM_Ctrl to its off status is coupled to an output terminal of the first comparator CMP1 that operates based on the status signal Vc about the output voltage Vo.

As shown, the frequency adjuster 206 asserts a turn-on frequency control signal FREQ based on the sensed current Isen. The turn-on frequency control signal FREQ is coupled to the 'S' terminal of the first SR latch SR_latch1. In response to the asserted turn-on frequency control signal FREQ, the PWM control signal PWM_Ctrl is set to its on status. The first comparator CMP1 has a positive input terminal '+' coupled to a reference ramp signal Ramp and a negative terminal '−' coupled to the status signal Vc about the output voltage Vo. The output terminal of the first comparator CMP1 is coupled to the 'R' terminal of the first SR latch SR_latch1. In response to the output terminal of the first comparator CMP1 being its asserted status, the PWM control signal PWM_Ctrl is reset to its off status. Accordingly, the power transistor driver 102 controls the PWM signal cs1 to control the turn-on frequency of the pull-up transistor Mp. In response to a heavy load situation presented by the increased sensed current Isen, the frequency adjuster 206 asserts the turn-on frequency control signal FREQ more frequently and, accordingly, the PWM control signal PWM_Ctrl is set to its on status more frequently. Thus, the pull-up transistor Mp is turned on more frequently to properly work in the high load situation.

Figure 3A:
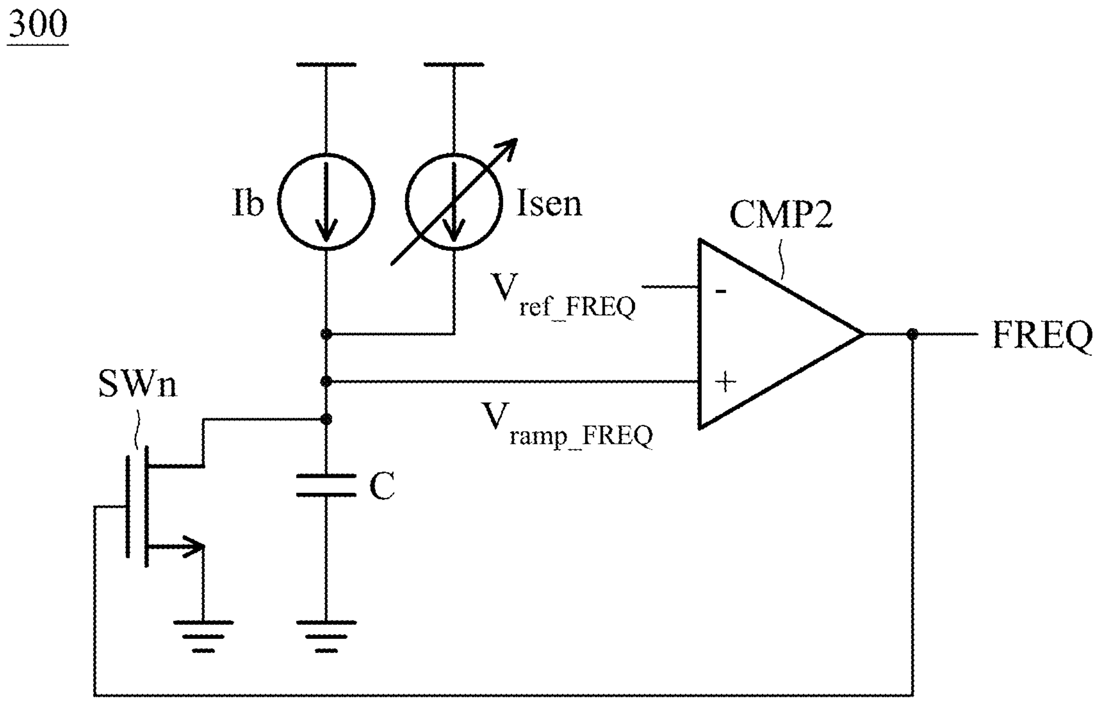
FIG. 3A illustrates a frequency adjuster 300 in accordance with an exemplary embodiment of the disclosure.

FIG. 3A illustrates a frequency adjuster 300 in accordance with an exemplary embodiment of the disclosure. The frequency adjuster 300 directs a base current Ib and the sensed current Isen to charge a capacitor C to generate a frequency-control ramp voltage Vramp_FREQ. The frequency adjuster 300 includes a second comparator CMP2 having a positive input terminal '+' coupled to the frequency-control ramp voltage Vramp_FREQ, and a negative input terminal '−' coupled to a frequency-control reference ramp Vref_FREQ. In response to the frequency-control ramp voltage Vramp_FREQ exceeding the frequency-control reference ramp Vref_FREQ, the second comparator CMP2 asserts the turn-on frequency control signal FREQ, which is coupled to the 'S' terminal of the first SR latch SR_latch1 of FIG. 2.

In FIG. 3A, the frequency adjuster 300 further includes an NMOS switch SWn for establishing a discharging path for the capacitor C. The gate terminal of the NMOS switch SWn is controlled by the turn-on frequency control signal FREQ. When the NMOS switch SWn is closed by the turn-on frequency control signal FREQ, the capacitor C is discharged, the frequency-control ramp voltage Vramp_FREQ falls, and the turn-on frequency control signal FREQ is deasserted.

Figure 3B:
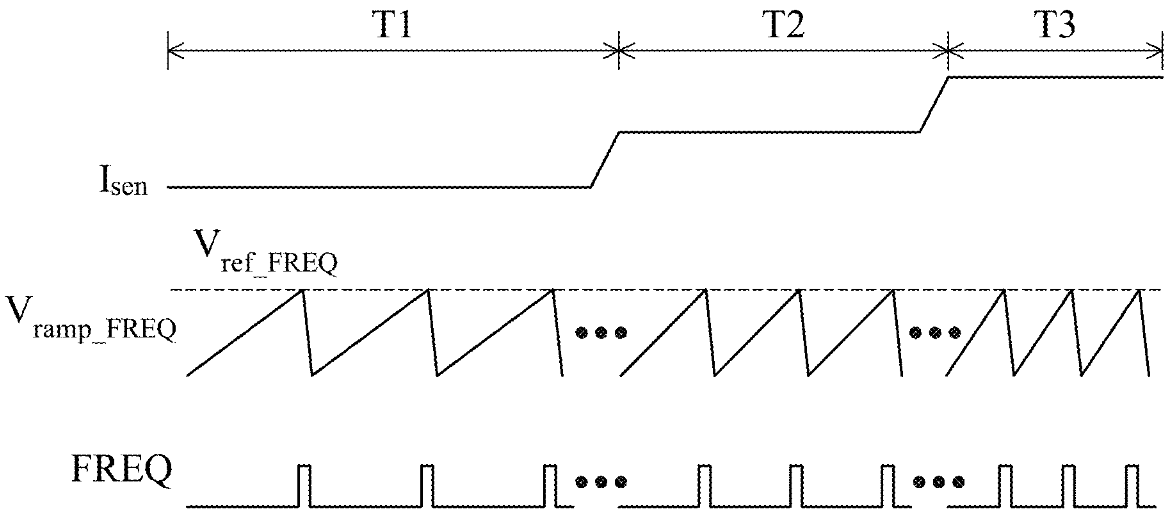
FIG. 3B illustrates the waveforms of the signals of FIG. 3A.

FIG. 3B illustrates the waveforms of the signals of FIG. 3A. In timing intervals T1, T2, and T3, the sensed current Isen increases in steps. The charging current supplied to the capacitor C, therefore, is increased in steps. The frequency-control ramp voltage Vramp_FREQ, thus, exceeds the frequency-control reference ramp Vref_FREQ more frequently, so as the asserting of the turn-on frequency control signal FREQ. The turn-on frequency of the pull-up transistor Mp is successfully increased to deal with the heavy load situation.

Figure 4A:
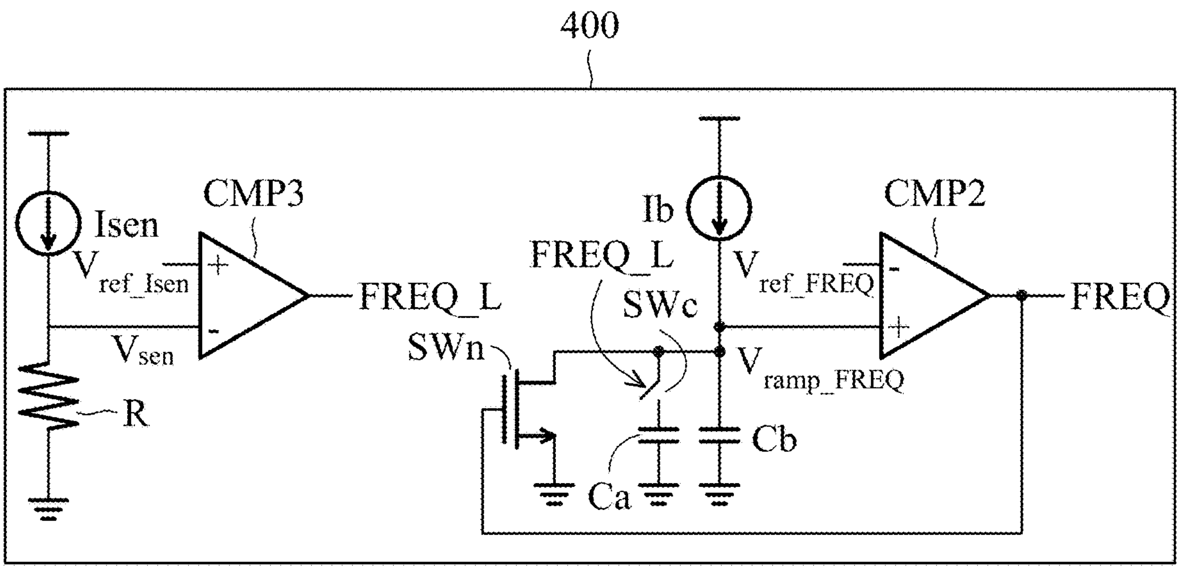
FIG. 4A illustrates a frequency adjuster 400 in accordance with an exemplary embodiment of the disclosure.

FIG. 4A illustrates a frequency adjuster 400 in accordance with an exemplary embodiment of the disclosure. Compare to the capacitor charging structure of FIG. 3A, the frequency adjuster 400 supplies only the base current Ib to charge an adaptive capacitance structure. The adaptive capacitance structure includes an assisted capacitor Ca and a base capacitor Cb. When a capacitance control switch SWc is closed by a capacitance control signal FREQ_L, the assisted capacitor Ca is coupled in parallel with the base capacitor Cb to be charged by the base current Ib. Otherwise, the base current Ib only charges the base capacitor Cb.

The frequency adjuster 400 includes an I-to-V structure that generates the capacitance control signal FREQ_L based on the sensed current. The sensed current Isen is supplied to a resistor R to be transformed into a sensed voltage Vsen. The frequency adjuster 400 includes a third comparator CMP3 which has a positive input terminal '+' coupled to a sensed voltage reference Vref_Isen, a negative input terminal '−' coupled to the sensed voltage Vsen, and an output terminal outputting the capacitance control signal FREQ_L for control of the adaptive capacitance structure (Ca and Cb).

Figure 4B:
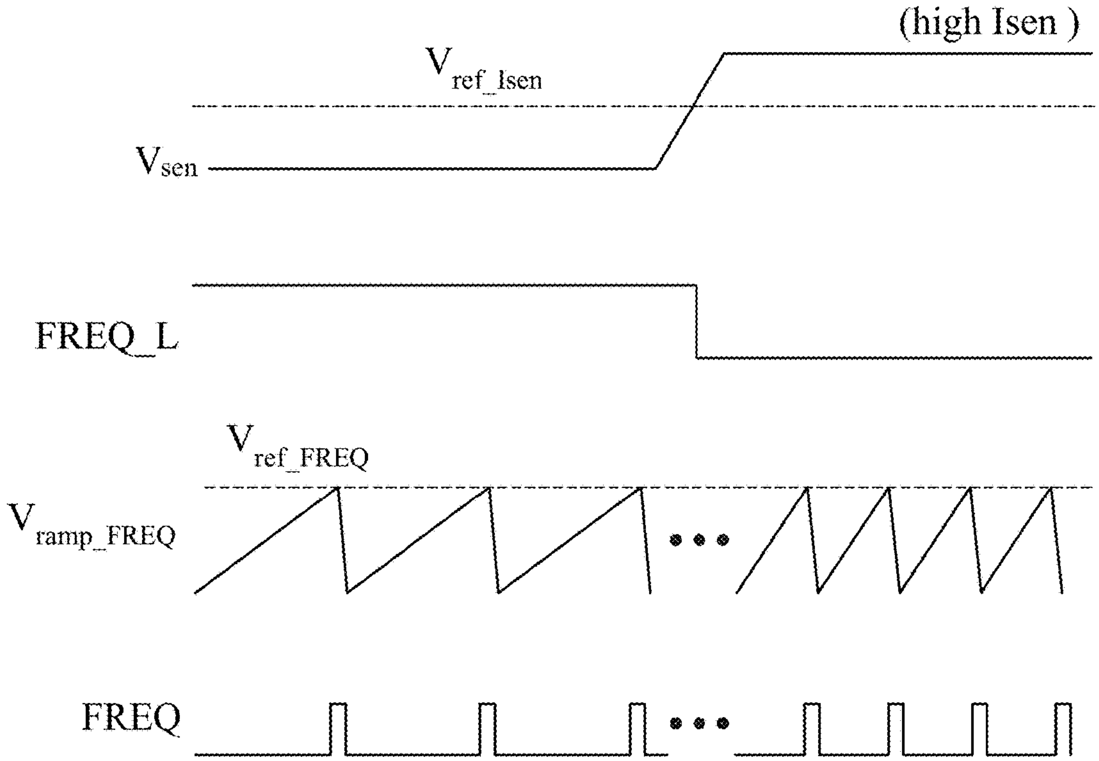
FIG. 4B illustrates the waveforms of the signals of FIG. 4A.

FIG. 4B illustrates the waveforms of the signals of FIG. 4A. In response to the heavy load situation, the increased sensed current Isen results in a high sensed voltage Vsen greater than the sensed voltage reference Vref_Isen. The capacitance control signal FREQ_L is deasserted accordingly to disconnect the assisted capacitor Ca from the base capacitor Cb. The frequency-control ramp voltage Vramp_FREQ, therefore, exceeds the frequency-control reference ramp Vref_FREQ more frequently, so as the asserting of the turn-on frequency control signal FREQ. The turn-on frequency of the pull-up transistor Mp is successfully increased to deal with the heavy load situation.

Another type of the PWM control signal generator 104 is presented below. In the following examples, the PWM control signal generator 104 sets the PWM control signal PWM_Ctrl to its on status according to a status signal Vc about the output voltage Vo, and resets the PWM control signal PWM_Ctrl to its off status according to the sensed current Isen.

Figure 5:
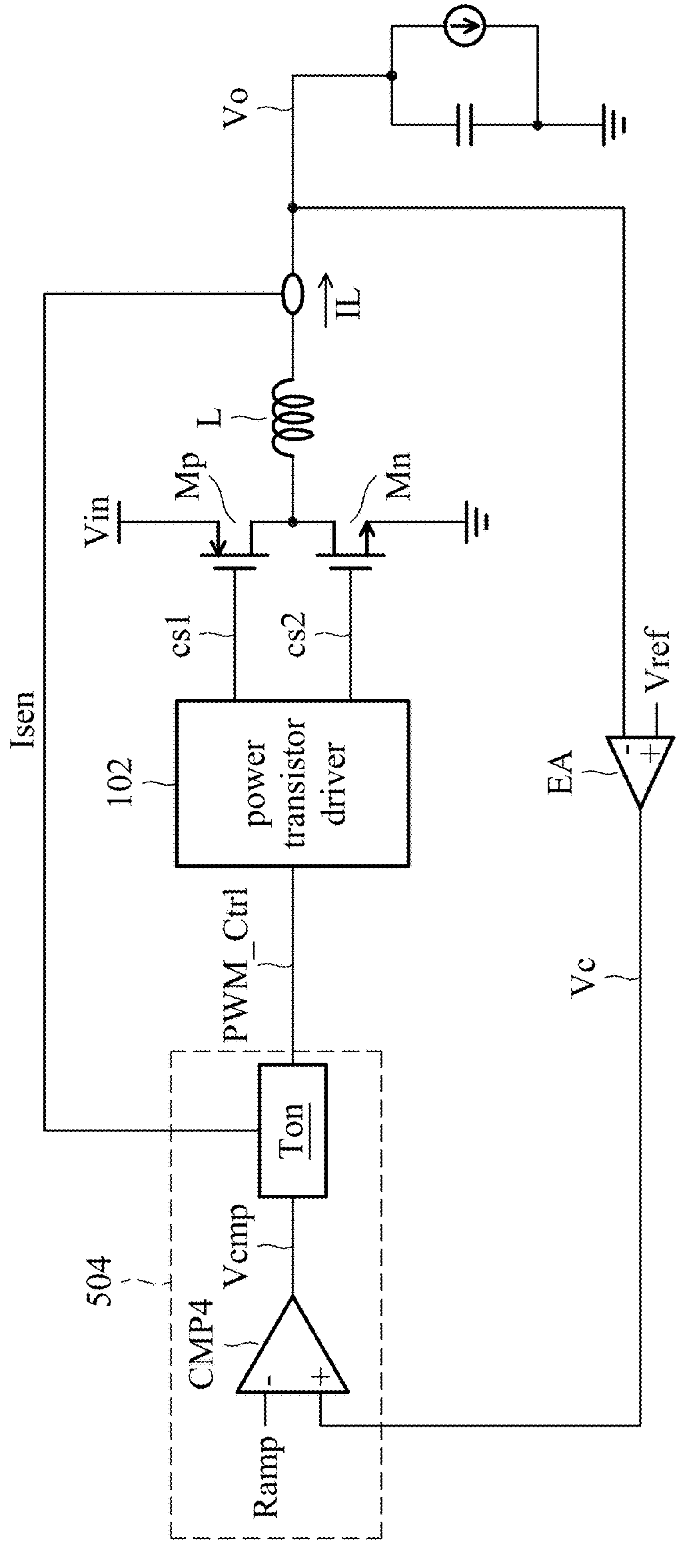
FIG. 5 illustrates a PWM control signal generator 504 using a turning-on control circuit Ton that generates the PWM control signal PWM_Ctrl based on the feedback of the output voltage Vo as well as the feedback of the inductor current IL.

FIG. 5 illustrates a PWM control signal generator 504 using a turning-on control circuit Ton that generates the PWM control signal PWM_Ctrl based on the feedback of the output voltage Vo as well as the feedback of the inductor current IL. As shown, the PWM control signal generator 504 has a fourth comparator CMP4 having a positive input terminal '+' coupled to the status signal Vc about the output voltage Vo and a negative terminal '−' coupled to a reference ramp signal Ramp. The fourth comparator CMP4 generates a compared result Vcmp to provide information about the output voltage Vo to the turning-on control circuit Ton. The turning-on control circuit Ton also receives the sensed current Isen related to the inductor current IL.

In an exemplary embodiment, in response to the compared result Vcmp being its asserted status, the turning-on control circuit Ton pulls up the PWM control signal PWM_Ctrl to its on status. Based on the sensed current Isen, the turning-on control circuit Ton controls the length of the on status of the PWM control signal PWM_Ctrl. Because the duty cycle of the PWM control signal PWM_Ctrl depends on the ratio of the output voltage Vo and the input voltage Vin, the length of the 'on' status of the PWM control signal PWM_Ctrl affects the turn-on frequency of the pull-up transistor Mp. In response to a heavy load situation presented by the sensed current Isen, the turning-on control circuit Ton reduces the length of the on status of the PWM control signal PWM_Ctrl. Thus, the turn-on frequency of the pull-up transistor Mp is increased to cope with the heavy load situation.

Figure 6A:
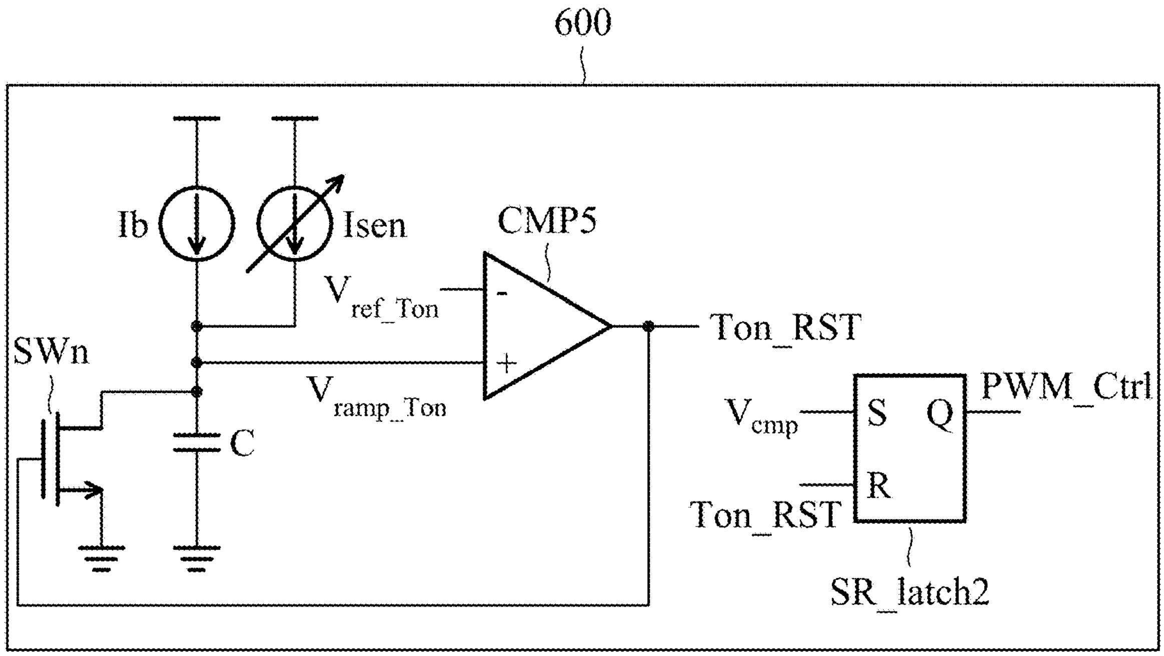
FIG. 6A illustrates a turning-on control circuit 600 in accordance with an exemplary embodiment of the disclosure.

FIG. 6A illustrates a turning-on control circuit 600 in accordance with an exemplary embodiment of the disclosure. The turning-on control circuit 600 includes a capacitor charging structure similar to that of the frequency adjuster 300. A base current Ib and the sensed current Isen both are directed to charge a capacitor C to generate a pull-up-control ramp voltage Vramp_Ton. A fifth comparator CMP5 has a positive input terminal '+' coupled to the pull-up-control ramp voltage Vramp_Ton, and a negative input terminal '−' coupled to the pull-up-control reference ramp Vref_Ton. In response to the pull-up-control ramp voltage Vramp_Ton exceeding the pull-up-control reference ramp Vref_Ton, the fifth comparator CMP5 asserts a pull-up-control reset signal Ton_RST. A gate terminal of an NMOS switch SWn is controlled by the pull-up-control reset signal Ton_RST. When the NMOS switch SWn is closed by the pull-up-control reset signal Ton_RST, the capacitor C is discharged, the pull-up-control ramp voltage Vramp_Ton falls, and the pull-up-control reset signal Ton_RST is deasserted. The pull-up-control reset signal Ton_RST is generated to deassert the on status of the PWM control signal PWM_Ctrl.

As show, the turning-on control circuit 600 further includes a second SR latch SR_latch2. The 'S' terminal of the second SR latch SR_latch2 receives the compared result Vcmp generated by the fourth comparator CMP4 of FIG. 5, to set the PWM control signal PWM_Ctrl to its on status. The pull-up-control reset signal Ton_RST is coupled to the 'R' terminal of the second SR latch SR_latch2, to reset the PWM control signal PWM_Ctrl to its off status. The turn-on frequency of the pull-up transistor Mp, therefore, is properly controlled based on the sensed current Isen.

Figure 6B:
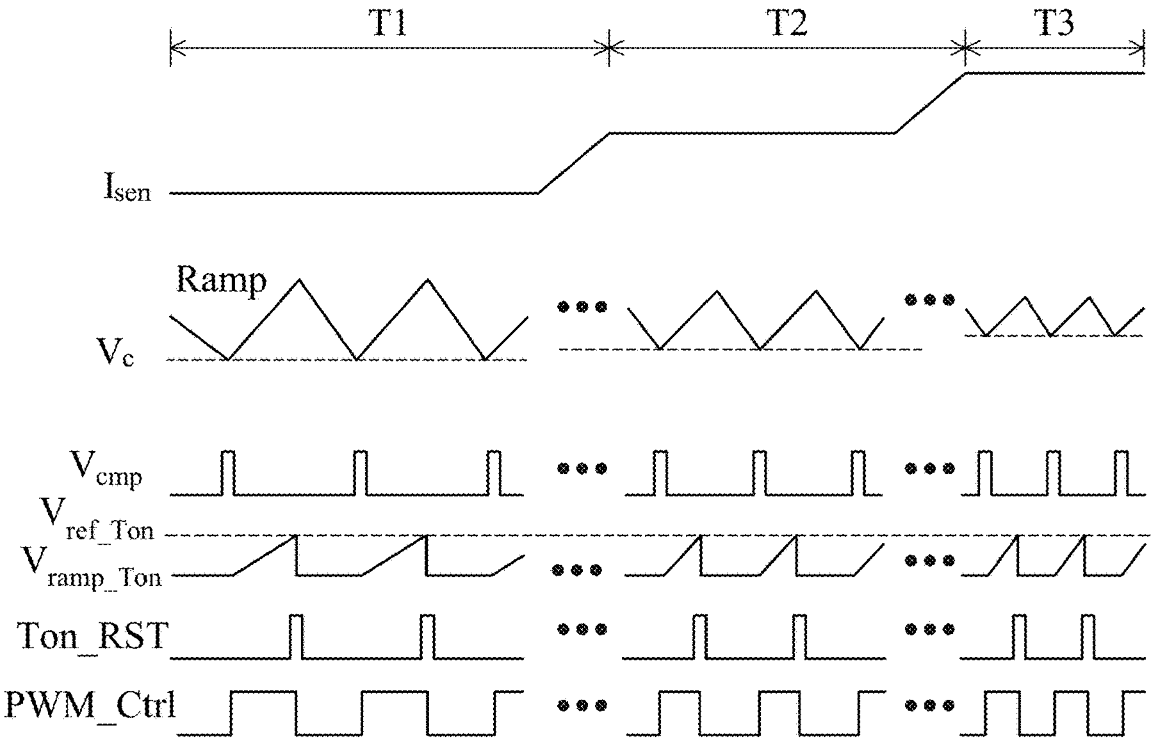
FIG. 6B illustrates the waveforms of the signals of FIG. 5 and FIG. 6A.

FIG. 6B illustrates the waveforms of the signals of FIG. 5 and FIG. 6A. In timing intervals T1, T2, and T3, the sensed current Isen increases in steps. The step changes of the circuit loading are also presented on the output voltage Vo, and the status signal Vc about the output voltage Vo and the reference ramp signal Ramp are affected. The compared result Vcmp generated by the fourth comparator CMP4 of FIG. 5 is asserted more frequently, so as the PWM control signal PWM_Ctrl.

In response to the sensed current Isen increasing in steps, the charging current supplied to the capacitor C is increased in steps. The pull-up-control ramp voltage Vramp_Ton exceeds the pull-up-control reference ramp Vref_Ton more frequently. Thus, the pull-up-control reset signal Ton_RST is asserted more frequently. The length of the on status of the PWM control signal PWM_Ctrl is reduced with the frequently asserted PWM control signal PWM_Ctrl. The turn-on frequency of the pull-up transistor Mp is successfully increased to deal with the heavy load situation.

Figure 7A:
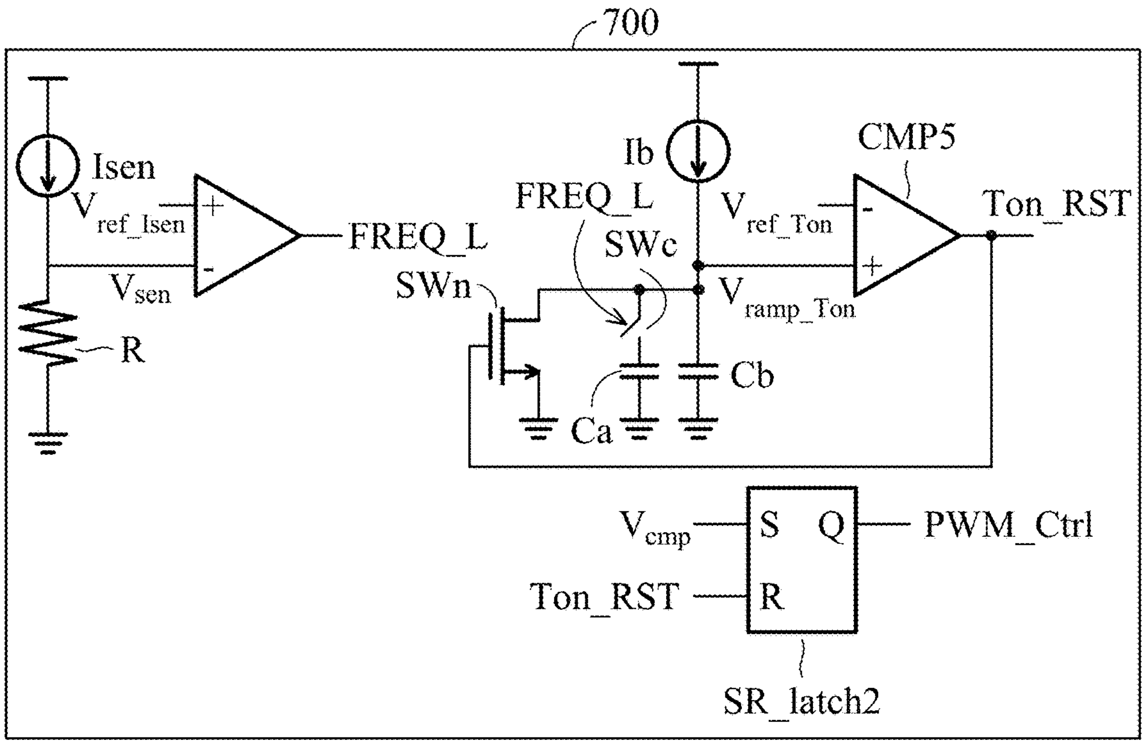
FIG. 7A illustrates a turning-on control circuit 700 in accordance with an exemplary embodiment of the disclosure.

FIG. 7A illustrates a turning-on control circuit 700 in accordance with an exemplary embodiment of the disclosure. Compare to the capacitor charging structure of FIG. 6A, the turning-on control circuit 700 supplies only the base current Ib to charge an adaptive capacitance structure. The adaptive capacitance structure includes an assisted capacitor Ca and a base capacitor Cb. When a capacitance control switch SWc is closed by a capacitance control signal FREQ_L, the assisted capacitor Ca is coupled in parallel with the base capacitor Cb to be charged by the base current Ib. Otherwise, the base current Ib only charges the base capacitor Cb. The turning-on control circuit 700 includes an I-to-V structure similar to that of FIG. 4A, for generation of the capacitance control signal FREQ_L.

Figure 7B:
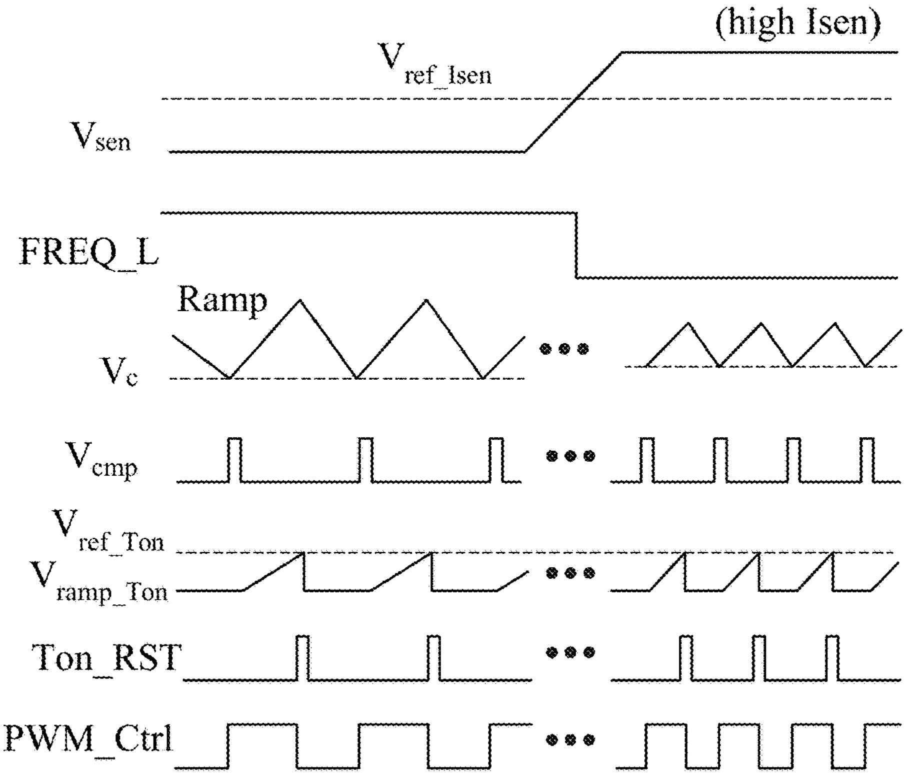
FIG. 7B illustrates the waveforms of the signals of FIG. 5 and FIG. 7A.

FIG. 7B illustrates the waveforms of the signals of FIG. 5 and FIG. 7A. In response to the heavy load situation, the compared result Vcmp generated by the fourth comparator CMP4 of FIG. 5 is asserted more frequently. The PWM control signal PWM_Ctrl is asserted more frequently.

The increased sensed current Isen results in a high sensed voltage Vsen greater than the sensed voltage reference Vref_Isen. The capacitance control signal FREQ_L is deasserted accordingly to disconnect the assisted capacitor Ca from the base capacitor Cb. The pull-up-control ramp voltage Vramp_Ton, therefore, exceeds the pull-up-control reference ramp Vref_Ton more frequently, so as the pull-up-control reset signal Ton_RST. The length of the 'on' status of the PWM control signal PWM_Ctrl is reduced with the frequently asserted PWM control signal PWM_Ctrl. The turn-on frequency of the pull-up transistor Mp is successfully increased to deal with the heavy load situation.

In addition to the forgoing exemplary embodiments, any buck converter senses the inductor current IL to adjust the turn-on frequency of the pull-up transistor Mp coupled between the input voltage Vin and the power transformation component may involve the proposed techniques.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A buck converter converting an input voltage to an output voltage, comprising:

a power transformation component, a pull-up transistor, and a pull-down transistor, wherein the pull-up transistor is operative to couple the input voltage to the power transformation component, the pull-down transistor is operative to couple a ground terminal to the power transformation component, and the power transformation component provides the output voltage;

a power transistor driver, receiving a pulse-width modulation (PWM) control signal to generate PWM signals to control gate terminals of the pull-up transistor and the pull-down transistor; and a PWM control signal generator, generating the PWM control signal based on feedback of the output voltage as well as feedback of a sensed current related to operations of the power transformation component, to modify a turn-on frequency of the pull-up transistor in response to a change in the sensed current, wherein:

the PWM control signal generator includes a frequency adjuster, which asserts a turn-on frequency control signal based on the sensed current;

in response to the asserted turn-on frequency control signal, the PWM control signal is set to its on status;

the PWM control signal is reset to its off status according to a status signal about the output voltage;

in response to the PWM control signal being the on status, the pull-up transistor couples the input voltage to the power transformation component; and in response to the PWM control signal being the off status, the pull-up transistor disconnects the input voltage from the power transformation component.

2. The buck converter as claimed in claim 1, wherein:

the buck converter further comprises an error amplifier, which has a positive input terminal coupled to a reference voltage, a negative input terminal coupled to the output voltage, and an output terminal outputting the status signal about the output voltage;

the PWM control signal generator comprises a first comparator, which has a positive input terminal coupled to a reference ramp signal, and a negative terminal coupled to the status signal about the output voltage; and in response to an output terminal of the first comparator being its asserted status, the PWM control signal is reset to its off status.

3. The buck converter as claimed in claim 2, wherein:

the PWM control signal generator further comprises a first SR latch for generation of the PWM control signal, which has an 'S' terminal coupled to the turn-on frequency control signal, an 'R' terminal coupled to the output terminal of the first comparator, and a 'Q' terminal providing the PWM control signal.

4. The buck converter as claimed in claim 1, wherein the frequency adjuster comprises:

a capacitor;

a base current, supplied to the capacitor with the sensed current to charge the capacitor to generate a frequency-control ramp voltage;

a comparator, having a positive input terminal coupled to the frequency-control ramp voltage, a negative input terminal coupled to a frequency-control reference ramp, and an output terminal providing the turn-on frequency control signal; and a discharging path, established to discharge the capacitor in response to the turn-on frequency control signal being its asserted status.

5. The buck converter as claimed in claim 1, wherein the frequency adjuster comprises:

an adaptive capacitance structure including a base capacitor, an assisted capacitor, and a capacitance control switch controlled by a capacitance control signal, wherein the assisted capacitor is connected in parallel with the base capacitor when the capacitance control switch is closed;

a base current, supplied to the adaptive capacitance structure to charge the adaptive capacitance structure to generate a frequency-control ramp voltage;

a comparator, having a positive input terminal coupled to the frequency-control ramp voltage, a negative input terminal coupled to a frequency-control reference ramp, and an output terminal providing the turn-on frequency control signal; and a discharging path, established to discharge the adaptive capacitance structure in response to the turn-on frequency control signal being its asserted status;

wherein the capacitance control signal depends on the sensed current.

6. The buck converter as claimed in claim 5, wherein the frequency adjuster further comprises:

a resistor, transforming the sensed current to a sensed voltage; and an additional comparator, having a positive input terminal coupled to a sensed voltage reference, a negative input terminal coupled to the sensed voltage, and an output terminal outputting the capacitance control signal.

7. The buck converter as claimed in claim 1, wherein the sensed current is evaluated from a cross voltage of the pull-up transistor.

8. A buck converter converting an input voltage to an output voltage, comprising:

a power transformation component, a pull-up transistor, and a pull-down transistor, wherein the pull-up transistor is operative to couple the input voltage to the power transformation component, the pull-down transistor is operative to couple a ground terminal to the power transformation component, and the power transformation component provides the output voltage;

a power transistor driver, receiving a pulse-width modulation (PWM) control signal to generate PWM signals to control gate terminals of the pull-up transistor and the pull-down transistor;

an error amplifier, which has a positive input terminal coupled to a reference voltage, a negative input terminal coupled to the output voltage, and an output terminal outputting a status signal about the output voltage; and a PWM control signal generator, generating the PWM control signal based on feedback of the output voltage as well as feedback of a sensed current related to operations of the power transformation component, to modify a turn-on frequency of the pull-up transistor in response to a change in the sensed current, wherein:

the PWM control signal generator comprises a comparator, which has a positive input terminal coupled to the status signal about the output voltage, a negative terminal coupled to a reference ramp signal, and an output terminal providing a compared result;

in response to the compared result being its asserted status, the PWM control signal is set to its on status;

the PWM control signal is reset to its off status according to the sensed current;

in response to the PWM control signal being the on status, the pull-up transistor couples the input voltage to the power transformation component; and in response to the PWM control signal being the off status, the pull-up transistor disconnects the input voltage from the power transformation component.

9. The buck converter as claimed in claim 8, wherein the PWM control signal generator further comprises a turning-on control circuit, and the turning-on control circuit comprises an SR latch for generation of the PWM control signal, which has an 'S' terminal coupled to the compared result, an 'R' terminal coupled to a pull-up-control reset signal generated based on the sensed current, and a 'Q' terminal providing the PWM control signal.

10. The buck converter as claimed in claim 9, wherein the turning-on control circuit further comprises: a capacitor; a base current, supplied to the capacitor with the sensed current to charge the capacitor to generate a pull-up-control ramp voltage; a reset comparator, having a positive input terminal coupled to the pull-up-control ramp voltage, a negative input terminal coupled to a pull-up-control reference ramp, and an output terminal providing the pull-up-control reset signal; and a discharging path, established to discharge the capacitor in response to the pull-up-control reset signal being its asserted status.

11. The buck converter as claimed in claim 9, wherein the turning-on control circuit further comprises: an adaptive capacitance structure including a base capacitor, an assisted capacitor, and a capacitance control switch controlled by a capacitance control signal, wherein the assisted capacitor is connected in parallel with the base capacitor when the capacitance control switch is closed; a base current, supplied to the adaptive capacitance structure to charge the adaptive capacitance structure to generate a pull-up-control ramp voltage; a reset comparator, having a positive input terminal coupled to the pull-up-control ramp voltage, a negative input terminal coupled to a pull-up-control reference ramp, and an output terminal providing the pull-up-control reset signal; and a discharging path, established to discharge the adaptive capacitance structure in response to the pull-up-control reset signal being its asserted status; and wherein the capacitance control signal depends on the sensed current.

12. The buck converter as claimed in claim 11, wherein the turning-on control circuit further comprises: a resistor, transforming the sensed current to a sensed voltage; and a capacitance-control comparator, which has a positive input terminal coupled to a sensed voltage reference, a negative input terminal coupled to the sensed voltage, and an output terminal outputting the capacitance control signal.

13. The buck converter as claimed in claim 8, wherein the sensed current is evaluated from a cross voltage of the pull-up transistor.

* * * * *